April 24, 1962 J. J. LYNOTT 3,031,532
MAGNETIC TRANSDUCER MOUNTING
Filed Nov. 1, 1954
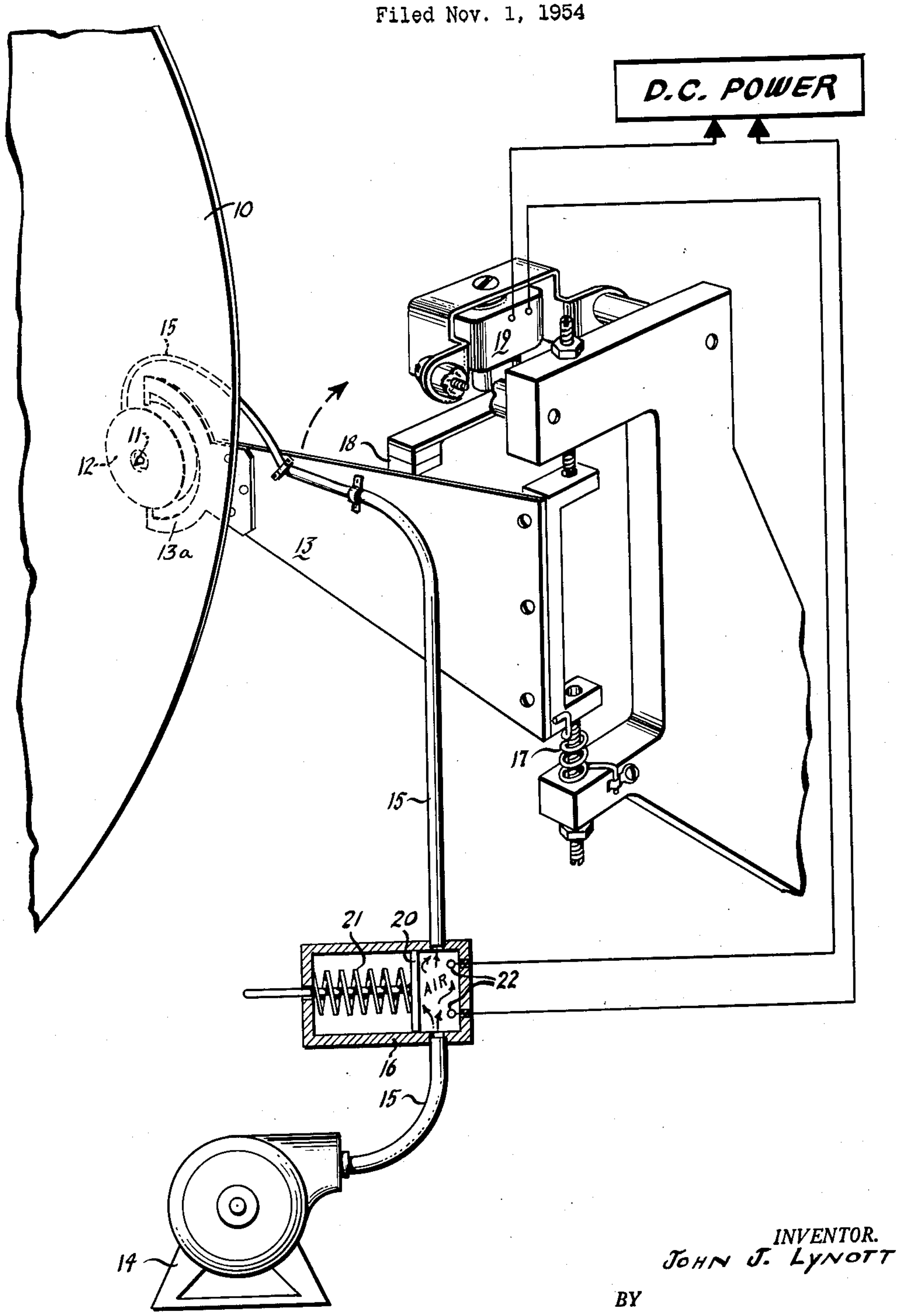
INVENTOR.
JOHN J. LYNOTT
BY
John B. Sponsler
AGENT United States Patent Office 3,031,532

Patented Apr. 24, 1962

3,031,532
MAGNETIC TRANSDUCER MOUNTING

John J. Lynott, Los Gatos, Calif., assignor to International Business Machines Corporation, New York, N.Y., a corporation of New York Filed Nov. 1, 1954, Ser. No. 466,030
3 Claims. (Cl. 179—100.2)

This invention relates to mountings for transducers in magnetic recording devices, particularly with respect to magnetic disc recorders and the like.

More particularly, this invention relates to a means for supporting a magnetic transducer to coact with a rotating magnetic disc for recording thereon and reproducing therefrom wherein an air film of predetermined thickness separates the transducer from the disc somewhat in the manner shown in copending applications, Serial Nos. 406,011 filed January 25, 1954, and 407,214 filed February 1, 1954. Normally an arrangement of this kind produces very effective magnetic recording and reproducing where there is a tendency for the magnetic disc to deviate from its mean plane of rotation, especially where discs of large diameters are utilized; however, a failure of the air supply and the consequent collapse of the air film between the transducer and the disc may result in damage to the magnetizable surface of the disc through scraping or gouging of the disc surface by the transducer making direct mechanical contact therewith. This damaging effect is particularly noticeable where discs are covered with thin magnetic coatings in order to obtain high signal definition.

In the present invention an arrangement is provided wherein a transducer is carried by a pivoted arm having an air actuated head for causing the transducer to cling to the surface of a rotating magnetic disc at a predetermined distance equal to the air film provided by the air head. The pivoted arm, however, is spring biased to force the transducer away from the disc and is normally latched in its operating position by a latch capable of being released under the control of a solenoid. A valve is provided in the air supply line to the air head so that upon failure of the air supply the valve operates to close electrical contacts which provide a circuit to the solenoid thereby causing the latch to be released and the arm to be pivoted by the aforesaid spring so that the transducer is pulled away from the magnetic disc surface.

It is accordingly the principal object of this invention to provide a safety mounting for a magnetic transducer coacting with a moving magnetic record member separated by an air film.

Other objects of the invention will be pointed out in the following description and claims and illustrated in the accompanying drawing, which disclose, by way of example, the principle of the invention and the best mode which has been contemplated of applying that principle.

The drawing shows a perspective view of the apparatus wherein a magnetic recording disc 10 is acted upon by a magnetic transducer 11 contained in an air head 12 carried by a pivoted arm 13. Air is supplied from a pump 14 via a hose 15 through a valve 16 to the air head 12 at a pressure sufficient to create an air film between the transducer 11 and the disc 10 preventing direct mechanical contact therebetween. A spring 17 normally urges the arm 13 to pivot the transducer 11 away from the disc 10; however, this action is offset by a latch 18 which normally locks the arm 13 in a predetermined position so that the suction derived from the Bernoulli effect of the air head as described in the aforementioned copending applications, spaces the transducer 11 at an appropriate predetermined distance from the disc 10, any slack being taken up by the arm 13 or by a yoke 13*a* attached to the end of the arm 13.

More explicitly, the arm 13, or the yoke 13*a* fastened to the end of the arm 13, may be made of flexible sheet material with the head 12 supported pivotally between the extremities of the arms of the yoke. Normally, therefore, when no air is supplied to the head 12 from the pump 14 and with the D.C. power supply off and the disc 10 stationary, the transducer 11 is adjusted to bear against the surface of the disc 10 by setting the latch 18 against the arm 13, a slight bending moment thereby being introduced into the arm 13, the yoke 13*a*, or both. Air pressure is thereafter supplied to the head 12 whereupon the head, together with the transducer 11, is displaced a few thousandths of an inch from the disc 10 via the effect explained in the copending applications referred to previously. The amount of spacing between the head 12 and the disc 10 is a function of the design of the head and the air pressure employed. The disc 10 may now be freely rotated without the transducer 11 impringing upon the surface of the record, since the air film between the head 12 and the disc 10 prevents physical contact therebetween.

The latch 18 is attached to the free end of the armature of a solenoid 19. Upon failure of the pump 14, or a severe reduction of the air pressure thereby provided, the valve 16 is operated so that its piston 20, relieved of the aforesaid pressure, is driven by a spring 21 to close a pair of contacts 22 thereby energizing solenoid 19, releasing latch 18, and the arm 13 is pivoted by the spring 17 to withdraw the transducer 11 away from the disc 10. After the air pressure is again restored via the pump 14, the arm 13 is manually reset so that latch 18 again retains the arm 13 in its proper operating position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A mounting for a magnetic transducer coacting with a moving magnetic recording medium comprising a pivoted arm for carrying said transducer, means on said arm actuated by an air supply for coacting directly with said recording medium to space the transducer a predetermined distance from the said medium, a counteracting spring for pulling said arm to withdraw said transducer from said medium, a movable latch for retaining the said arm in a predetermined position, a solenoid for operating said latch to release said arm, and an air valve including electrical contacts for energizing the said solenoid when said air supply is discontinued.

2. A mounting for a transducer coacting with a moving record medium comprising a pivoted, flexible arm arranged to carry a transducer at its free end, resilient means normally urging the said arm to pivot away from said medium, means for latching the said arm in a predetermined position with the said transducer bearing against said medium, means providing an air film for spacing the said transducer from the said medium a predetermined distance opposing the resistance of said arm, and means for releasing the said latch upon failure of the said air film providing means whereby the said arm is pivoted by said urging means to withdraw the said transducer from the said medium.

3. In combination with a recording medium a transducer mounting comprising a flexible, pivoted arm having an air head at its free end for carrying said transducer, a spring for urging the said arm away from the said medium, a movable stop coacting with said arm arranged so that the said transducer is normally positioned in contact with said medium, an air supply to the said head for providing an air film to space the head a predetermined distance from the said medium, a solenoid for operating the said stop, and an electro-pneumatic valve in the said air supply whereby a failure of the said supply energizes said solenoid to withdraw the said stop and causes said arm to be pivoted to withdraw the transducer from the said medium.

References Cited in the file of this patent

UNITED STATES PATENTS

| | | |
|---|---|---|
| 1,387,746 | Webb | Aug. 16, 1921 |
| 2,612 566 | Anderson | Sept. 30, 1952 |

FOREIGN PATENTS

| | | |
|---|---|---|
| 688,554 | Great Britain | Mar. 11, 1953 |